US012601277B2

(12) United States Patent
Truebenbach et al.

(10) Patent No.: US 12,601,277 B2
(45) Date of Patent: Apr. 14, 2026

(54) TURBFAN ENGINE

(71) Applicant: MTU Aero Engines AG, Munich (DE)

(72) Inventors: Jens Truebenbach, Munich (DE); Jan Von Frowein, Dachau (DE)

(73) Assignee: MTU Aero Engines AG, Munich (DE)

( * ) Notice: Subject to any disclaimer, the term of this patent is extended or adjusted under 35 U.S.C. 154(b) by 0 days.

(21) Appl. No.: 18/536,449

(22) Filed: Dec. 12, 2023

(65) Prior Publication Data

US 2024/0209747 A1 Jun. 27, 2024

(30) Foreign Application Priority Data

Dec. 16, 2022 (DE) .......................... 102022133702.2

(51) Int. Cl.
F01D 15/12 (2006.01)
F02C 7/32 (2006.01)
F02C 7/36 (2006.01)

(52) U.S. Cl.
CPC ................ F01D 15/12 (2013.01); F02C 7/32 (2013.01); F02C 7/36 (2013.01); *F05D 2220/323* (2013.01); *F05D 2240/60* (2013.01); *F05D 2260/40* (2013.01)

(58) Field of Classification Search
CPC . F01D 15/12; F01D 5/143; F01D 5/02; F02C 7/32; F02C 7/36; F02C 3/107; F05D 2220/323; F05D 2240/60; F05D 2240/20; F05D 2240/24; F05D 2240/30; F05D 2260/40; F05D 2260/40311; F05D 2260/4031; F02K 3/06
See application file for complete search history.

(56) References Cited

U.S. PATENT DOCUMENTS

| | | | |
|---|---|---|---|
| 10,001,083 B2 | 6/2018 | Rued | |
| 10,634,233 B1 * | 4/2020 | Smith | ................ F16H 57/0417 |
| 10,844,721 B2 | 11/2020 | Townes | |
| 2020/0291782 A1 * | 9/2020 | Townes | .................... F01D 5/08 |
| 2020/0370435 A1 * | 11/2020 | Bemment | .............. F01D 5/141 |
| 2020/0370511 A1 * | 11/2020 | Bemment | ................ F02C 7/36 |
| 2024/0258535 A1 | 8/2024 | Law | |

FOREIGN PATENT DOCUMENTS

| | | |
|---|---|---|
| EP | 3323989 A1 | 5/2018 |
| EP | 3708792 A1 | 9/2020 |

(Continued)

OTHER PUBLICATIONS

Grieb, H.: Projektierung von Turboflugtriebwerken. Basel : Springer Basel AG, 2004. pp. 537 to 545.—ISBN 978-3-0348-9627-6, see machine translation.

(Continued)

*Primary Examiner* — Dapinder Singh
(74) *Attorney, Agent, or Firm* — Davidson Kappel LLC

(57) ABSTRACT

A turbofan engine with a low-pressure turbine module having no more than four stages and a fan coupled to the low-pressure turbine module via a gearbox, the turbofan engine having a maximum thrust of at least 70 kN and at most 300 kN, and the low-pressure turbine module (4.2) having a ratio of the exit annulus area to the inlet annulus area, $A_{out}/A_{in}$, of at least 2.2 and at most 3.3.

14 Claims, 2 Drawing Sheets

(56)         References Cited

FOREIGN PATENT DOCUMENTS

EP      3812563  A1     4/2021
EP      2518272  B1     5/2022

OTHER PUBLICATIONS

Seitz, A., Habermann, A.L. , van Sluis, M., "Optimality Consider-
ations for Propulsive Fuselage Power Savings", Proc IMechE Part
G: Journal of Aerospace Engineering, published online, Apr. 8,
2020, https://doi.org/10.1177/0954410020916319.
Dewanji, Dipanjay & Gangoli Rao, Arvind & Buijtenen, Jos.
(2009). Feasibility Study of Some Novel Concepts for High Bypass
Ratio Turbofan Engines. 31. 10.1115/GT2009-59166m Conference:
ASME Turbo Expo 2009: Power for Land, Sea, and Air.
Gray D E: "Energy Efficient Engine Preliminary Design and Inte-
gration Studies", Nov. 1, 1978 (Nov. 1, 1978), XP055821774.

* cited by examiner

TURBFAN ENGINE

This claims the benefit of German Patent Application 102022133702.2, filed on Dec. 16, 2022 and hereby incorporated by reference herein.

The present invention relates to a turbofan engine having a low-pressure turbine module.

BACKGROUND INFORMATION

The present subject matter relates to a turbofan engine whose blade rings are coupled to the fan via a gearbox. An engine of this type is also referred to as "geared turbofan (GTF) engine." During operation, the fan rotates at a lower speed than the low-pressure turbine module due to the gear reduction. The term "low-pressure turbine module" as used herein refers to that section of the aircraft gas turbine of the turbofan engine which is downstream of an upstream-most turbine module immediately downstream of the combustor in the direction of flow. The low-pressure turbine module may drive a middle shaft and/or an innermost shaft of the turbofan engine.

SUMMARY OF THE INVENTION

The present invention addresses the technical problem of providing an advantageous turbofan engine.

The present invention provides a turbofan engine (1) having a low-pressure turbine module (4.2) having no more than four stages, and a fan (12) coupled to the low-pressure turbine module (4.2) via a gearbox (11). This turbofan engine has a maximum thrust (take-off thrust) of at least 70 kN and at most 300 kN, the low-pressure turbine module having a ratio $A_{out}/A_{in}$; i.e., ratio of the annulus area at the exit of the low-pressure turbine module to the annulus area at its inlet, of at least 2.2 and at most 3.3. With its thrust, the turbofan engine is designed for so-called narrow body applications; i.e., for regional, short-range, and medium-range aircraft. The fact that the area ratio $A_{in}/A_{out}$ of the low-pressure turbine module takes a value of at least 2.2 is an indication of a relatively high expansion ratio, which is implemented in particular in conjunction with relatively small number of stages of the low-pressure turbine module. The engine or low-pressure turbine module designed in this way makes it possible to achieve increased efficiency in narrow body applications.

Preferred embodiments will be apparent from the dependent claims and the entire disclosure. In the description of the features, a distinction is not always specifically made between the different claims categories. For example, when a turbofan engine designed for a specific operation is described, such description should be read to refer also to a corresponding method or a corresponding method for operating the turbofan engine. Furthermore, information regarding the low-pressure turbine module always also refers to the turbofan engine having such a low-pressure turbine module.

In a preferred embodiment, the maximum thrust of the turbofan engine is further limited, advantageous upper limits being at most 250 kN, 200 kN, or 170 kN. As mentioned at the outset, the described advantages can be realized in particular in regional, short-range, and medium-range aircraft; i.e., lower thrust classes. Possible lower limits of the maximum thrust, which may also be of interest and should be considered as being disclosed independently of the upper limits, are 80 kN, 90 kN, or 110 kN, for example. Generally, the thrust is considered herein under the sea-level conditions of the International Standard Atmosphere (ISA) of the International Civil Aviation Organization (ICAO); i.e., inter alia, at a temperature of 15° C. and a pressure of one atmosphere.

In a preferred embodiment, the fan has a diameter of at most 247 cm, with increasing preference in the order given, at most 240 cm, 233 cm, 226 cm, or 219 cm, which again may be an indication of the narrow body applications. A possible lower limit of the diameter may be, for example, 204 cm.

In a preferred embodiment, the low-pressure turbine module has an axial length of at most 32 cm, further preferably at most 26 cm, and particularly preferably at most 22 cm. A possible lower limit may be, for example, 20 cm. In an advantageous embodiment, the low-pressure turbine module is a three-stage design and has an axial length of at least 20 cm and at most 22 cm. The axial length is taken herein as the axial distance between the leading edge of a rotor blade or stator vane of the first blade or vane ring of the low-pressure turbine module and the trailing edge of a rotor blade of its last blade ring, the axial position of the leading and trailing edges being taken at the respective radially outer ends thereof. If, for example, a mid turbine frame (MTF) is provided upstream of the low-pressure turbine module and/or a turbine exit case (TEC) is provided downstream thereof, these components are not taken into account in the length measurement, so they are not considered as belonging to the low-pressure turbine module.

The limitation of the axial length, in particular in combination with a small number of stages (see below), can be advantageous with respect to a compact, and thus, for example, also weight-reduced, design, which ultimately may, for example, reduce fuel consumption. With the small number of stages, production and operating costs can be reduced; for example, fewer components need to be stocked, installed, and also maintained.

Preferably, the low-pressure turbine module is designed with four or three stages. The three-stage low-pressure turbine module may have three rotor blade rings and two or three stator vane rings, the last (downstream-most) ring always being a rotor blade ring. The axial length of such a low-pressure turbine module may, for example, be at most 29 cm (with a possible lower limit being at least 20 cm). The four-stage low-pressure turbine module may have four rotor blade rings and three or four stator vane rings, the last ring always being a rotor blade ring. Such a low-pressure turbine module may, in particular, have an axial length of at most 32 cm (with a possible lower limit being at least 25 cm).

According to a preferred embodiment, the area ratio $A_{out}/A_{in}$ of the low-pressure turbine module is at most 2.7 (in words: two point seven), and in another preferred embodiment at most 2.4 (in words: two point four). In this way, a high degree of efficiency can be achieved, especially in conjunction with the limited axial length and/or a three-stage design.

In a preferred embodiment, the bypass ratio of the turbofan engine is at least 12:1 and at most 15:1. The bypass ratio (BPR) indicates the ratio of the air mass flow externally bypassing the engine core downstream of the fan (secondary or bypass flow) to the engine core flow passing through the compressor, combustor, and turbine. The high bypass ratio may, for example, increase the propulsive efficiency and reduce noise emissions.

In a preferred embodiment, the rotational speed of the low-pressure turbine module, referred to as "redline" in the type certificate of the engine," is at least 6,500 rpm (revolutions per minute), in words: six thousand five hundred revolutions per minute. An advantageous upper limit, which should generally also be considered as being disclosed independently of the lower limit, is 14,500 rpm. This low-pressure turbine module speed range (6,500-14,500 rpm, redline) may preferably be realized in a turbofan engine with a maximum thrust of 70-300 kN. Other advantageous speed/thrust combinations are:

| 7,500-14,500 rpm | redline | with a thrust of | 70-250 kN |
|---|---|---|---|
| 8,500-14,500 rpm | redline | with a thrust of | 70-180 kN |
| 9,500-14,500 rpm | redline | with a thrust of | 70-150 kN |
| 10,000-11,500 rpm | redline | with a thrust of | 110-140 kN |

Consequently, higher rotational speeds are realized in the respective thrust ranges than in a conventional engine, which may reduce aerodynamic loads and thus enable higher efficiencies.

The invention also relates to an aircraft, in particular a narrow body aircraft, having a turbofan engine as disclosed herein.

The invention further relates to the use of a low-pressure turbine module in a herein-described turbofan engine, in particular in a rotational speed range as disclosed above and/or a corresponding thrust range.

BRIEF DESCRIPTION OF THE DRAWINGS

The invention will now be described in more detail with reference to an exemplary embodiment. The individual features may also be essential to the invention in other combinations within the scope of the other independent claims, and, as above, no distinction is specifically made between different claim categories.

DETAILED DESCRIPTION

Figure 1:
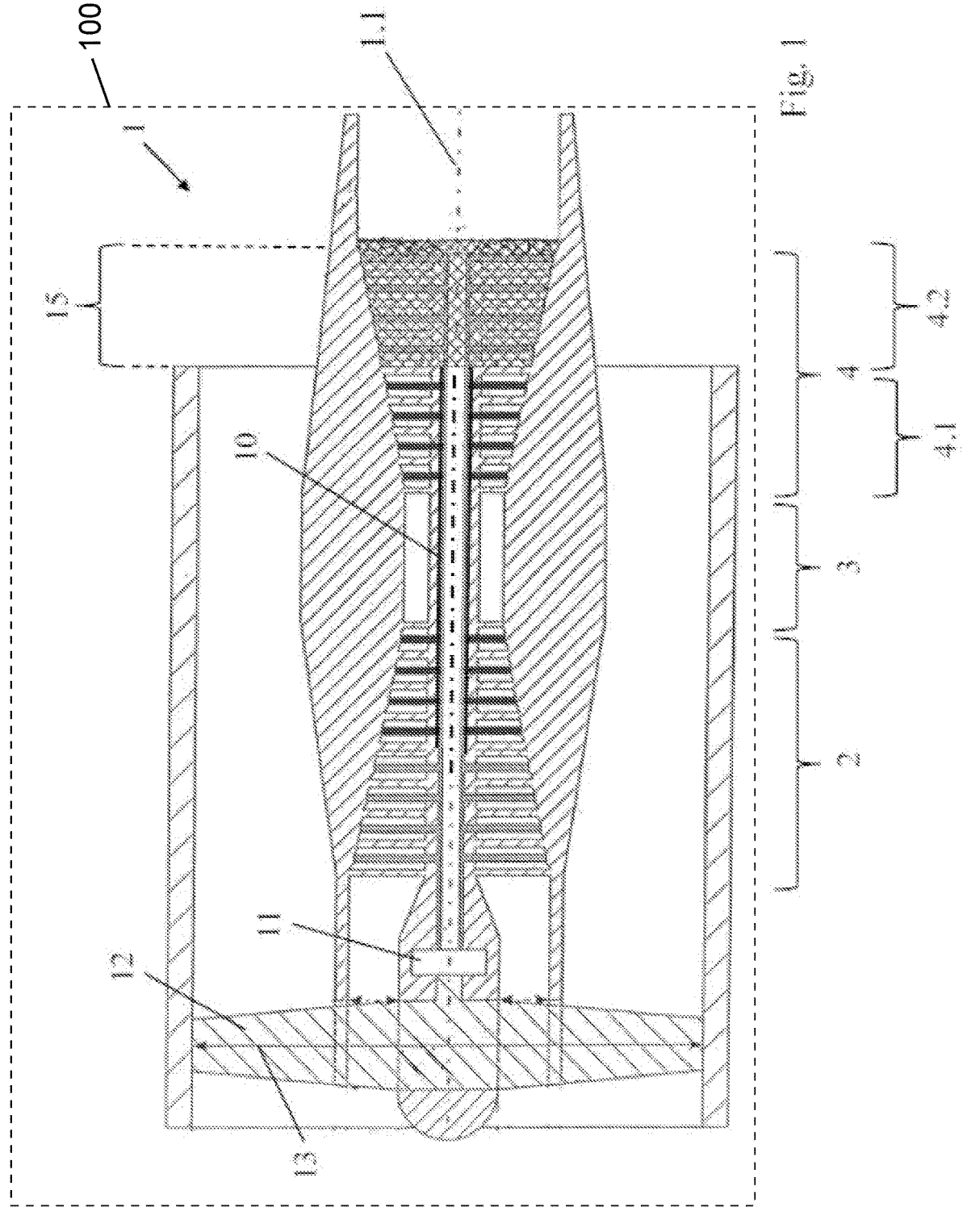
FIG. 1 is a schematic axial cross-sectional view of a turbofan engine.

FIG. 1 shows a turbofan engine 1 of a regional, short-range or medium-range aircraft 100 (shown solely schematically) in a schematic axial cross-sectional view; i.e., in a cross-sectional plane containing its longitudinal axis 1.1. Turbofan engine 1 is functionally divided into a compressor 2, a combustor 2, and a turbine 4, the latter including a high-pressure turbine module 4.1 and a low-pressure turbine module 4.2. During operation, the intake air is compressed in compressor 2, mixed and burned with fuel in the downstream combustor 3, and the resulting hot gas is then expanded in turbine 4.

The high-pressure and low-pressure turbine modules 4.1, 4.2 are each multi-stage designs; i.e., each have a plurality of stator vane rings and rotor blade rings disposed axially one behind the other. The latter are set in rotation about longitudinal axis 1.1 by the expanding hot gas, a portion of this kinetic energy being used to drive compressor 2. A shaft 10, on which the rotor blade rings of low-pressure turbine module 4.2 rotate, is coupled via a gearbox 11 to a fan 12 of turbofan engine 1, the fan 12 thus being driven by a portion of the kinetic energy produced.

A diameter 13 of fan 12 is, by way of example, 215 cm. Low-pressure turbine module 4.2, which is a four-stage or in particular a three-stage design, has an axial length 15 of 28 cm. In the present case, the area ratio $A_{out}/A_{in}$ of low-pressure turbine module 4.2 is, by way of example, 2.8.

Overall, an expansion ratio greater than 8 is realized with low-pressure turbine module 4.2.

The overall turbofan engine may be designed for a thrust range from 110 kN to 140 kN, with the rotational speed (redline) of the low-pressure turbine module then being between 10,000 and 11,500 rpm.

Figure 2:
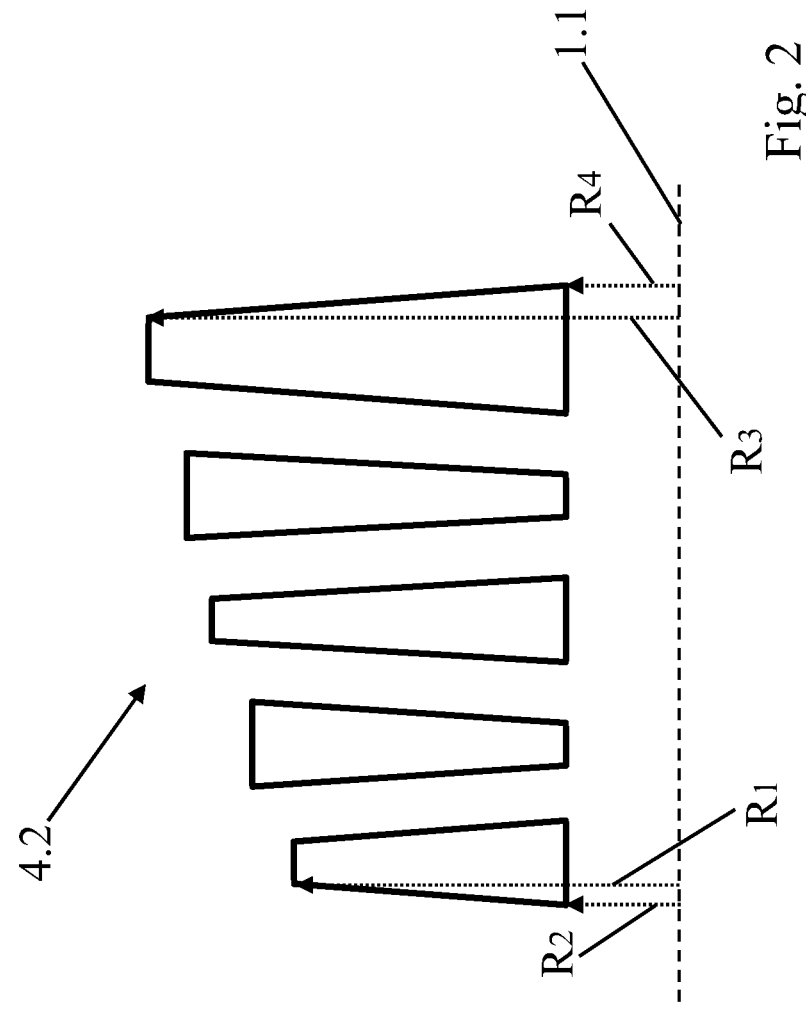
FIG. 2 depicts a ratio of the exit annulus area to the inlet annulus area.

FIG. 2 shows a schematic view of low-pressure turbine module 4.2 with several schematically depicted blades and vanes and illustrates how the area ratio $A_{out}/A_{in}$ is determined. $A_{in}$ is determined as the difference of the squares of the radius $R_1$ at the radially outermost position of the upstream-most leading edge ($R_1{}^2$ at the upstream-most leading edge at the radially outermost position) and the radius $R_2$ at the radially innermost position of the upstream-most leading edge ($R_2{}^2$ at the upstream-most leading edge at the radially innermost position), this difference being multiplied by the circle number $\pi$. $A_{out}$ is determined as the difference of the squares of the radius $R_3$ at the radially outermost position of the downstream-most trailing edge ($R_3{}^2$ at the downstream-most trailing edge at the radially outermost position) and the radius $R_4$ at the radially innermost position of the downstream-most trailing edge ($R_4{}^2$ at the downstream-most trailing edge at the radially innermost position), this difference being multiplied by the circle number $\pi$.

LIST OF REFERENCE NUMERALS

Turbofan engine 1
Longitudinal axis 1.1
Compressor 2
Combustor 3
Turbine 4
High-pressure turbine module 4.1
Low-pressure turbine module 4.2
Shaft 10
Gearbox 11
Fan 12
Diameter 13
Axial length 15

What is claimed is:

1. A turbofan engine comprising:
a low-pressure turbine module having no more than four stages; and
a fan coupled to the low-pressure turbine module via a gearbox, the turbofan engine having a maximum thrust of at least 110 kN and at most 140 kN,
and wherein the low-pressure turbine module has a ratio of the exit annulus area to the inlet annulus area, Aout/Ain, of at least 2.2 and at most 3.3,
the fan having a diameter of at least 204 cm and at most 247 cm.

2. The turbofan engine as recited in claim 1 wherein the turbofan engine has a maximum thrust of at most 250 kN.

3. The turbofan engine as recited in claim 2 wherein the maximum thrust is at most 200 kN.

4. The turbofan engine as recited in claim 3 wherein the maximum thrust is at most 170 kN.

5. The turbofan engine as recited in claim 1 wherein the diameter is at most 219 cm.

6. The turbofan engine as recited in claim 1 wherein the low-pressure turbine module has an axial length of at least 20 cm and at most 32 cm.

7. The turbofan engine as recited in claim 6 wherein the axial length is at most 22 cm.

8. The turbofan engine as recited in claim 1 wherein the low-pressure turbine module is a three-stage design, and a ratio $A_{out}/A_{in}$ of the low-pressure turbine module is at least 2.2 and at most 2.4.

9. The turbofan engine as recited in claim 1 wherein the low-pressure turbine module is a four-stage design, and a ratio $A_{out}/A_{in}$ of the low-pressure turbine module is at least 2.5 and at most 3.3.

10. The turbofan engine as recited in claim 1 wherein a bypass ratio is at least 12:1 and at most 15:1.

11. The turbofan engine as recited in claim 1 wherein a redline rotational speed of the low-pressure turbine module is at least 6,500 rpm and at most 14,500 rpm.

12. An aircraft comprising the turbofan engine as recited in claim 1.

13. A method of operating the turbofan engine as recited in claim 1 comprising: operating the turbofan engine below or at the maximum thrust.

14. The method as recited in claim 13, wherein the low-pressure turbine module rotates at a speed of 6,500-14,500 rpm.

\* \* \* \* \*